Figure 7:
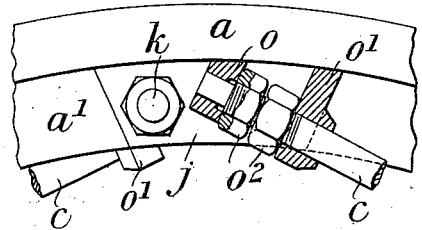

M. W. PECK.
SPRING WHEEL.
APPLICATION FILED DEC. 12, 1908.
974,815.
Patented Nov. 8, 1910.
2 SHEETS—SHEET 1.
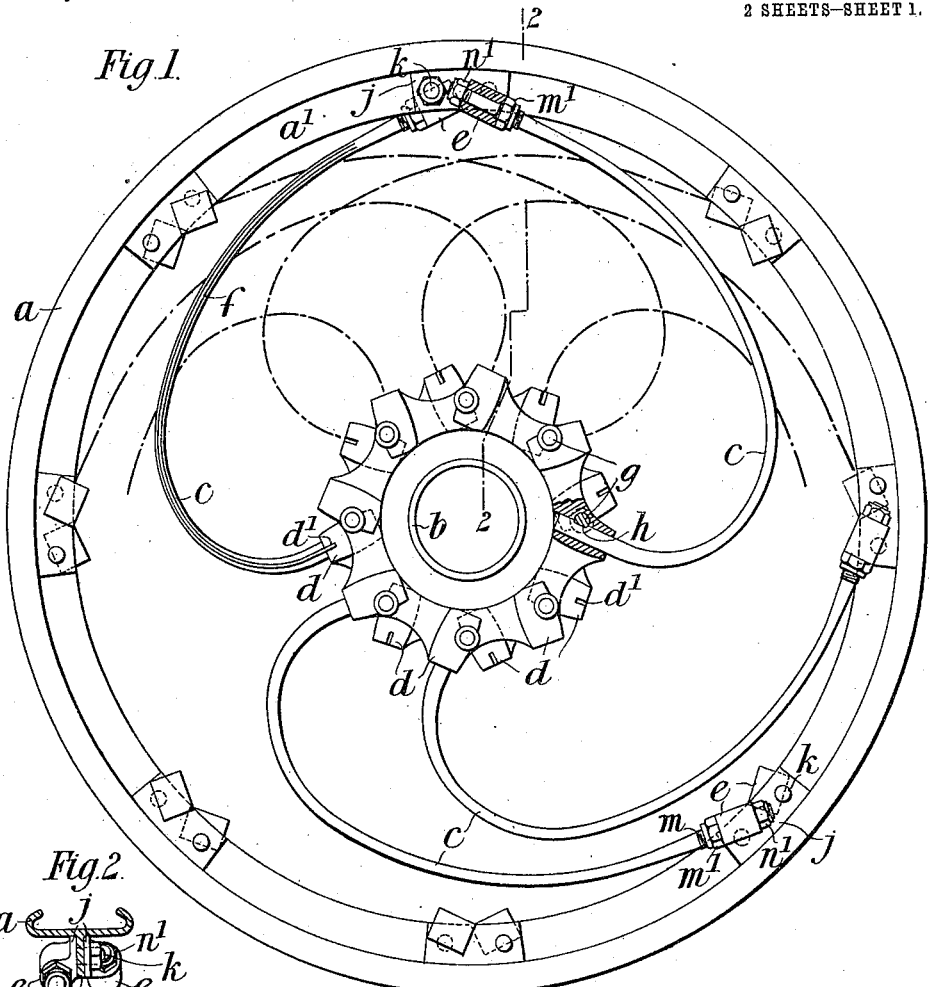
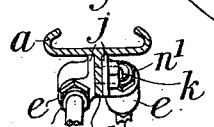
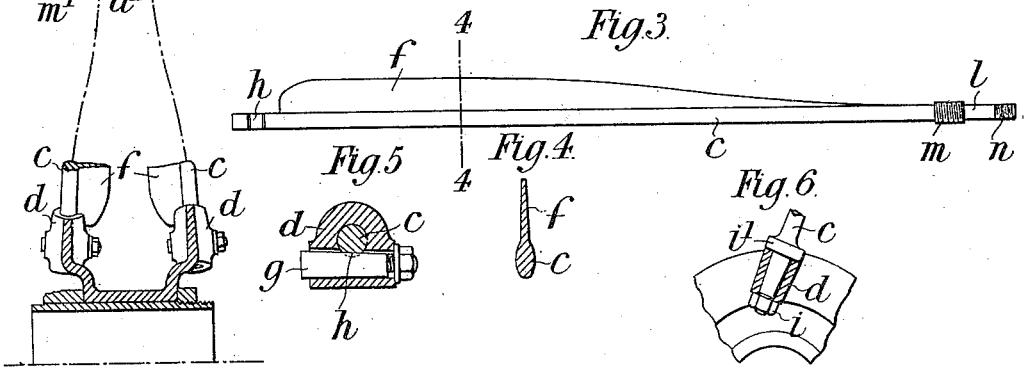
Witnesses.
J. K. Moore
R. E. Barry
Inventor:
Myles Wellington Peck
By Whitaker Prevost
Attys.

UNITED STATES PATENT OFFICE.

MYLES WELLINGTON PECK, OF PUTNEY, LONDON, ENGLAND.

SPRING-WHEEL.

974,815.   Specification of Letters Patent.   Patented Nov. 8, 1910.

Application filed December 12, 1908. Serial No. 467,283.

*To all whom it may concern:*

Be it known that I, MYLES WELLINGTON PECK, a subject of the King of Great Britain, residing at Malbrook Road, Putney, in the county of London, England, have invented new and useful Improvements in Spring-Wheels, of which the following is a specification.

My invention relates to spring wheels of the type wherein two series of springs of approximately C-shape and rigidly secured to the hub and the wheel rim, are employed, and wherein such springs are arranged in different planes converging to or toward the same plane at the rim, and in such a manner that the concave side of one series of springs will face in the opposite direction to the concave side of the other series of springs, the object of my present invention being to construct a wheel of this class wherein the weight carried by the wheel is distributed more evenly between the spokes than heretofore, and wherein greater lateral rigidity is afforded.

In the accompanying drawing:—Figure 1 is a side elevation of my improved wheel, a number of the spokes of which are omitted in order to avoid confusion. Fig. 2 is a section on the line 2—2, Fig. 1. Fig. 3 is a development of one of the spokes of the wheel, and Fig. 4 is a section on the line 4—4 Fig. 3 drawn to a larger scale. Fig. 5 is a view drawn to a larger scale than Fig. 2 showing the method of securing the spokes in the hub. Fig. 6 is a sectional side view illustrating another arrangement for connecting the spokes to the hub. Figs. 7, 8, 9, 10, 11 and 12 are views illustrating different methods of attaching the spokes to the rim. Fig. 13 is a section on the line 13—13, Fig. 12.

$a$ indicates the rim of the wheel which may be adapted to carry either a solid, cushioned, or pneumatic tire of any suitable construction; $b$ indicates the hub and $c, c$ the spokes.

In the arrangement of my invention shown in Figs. 1 to 5, the hub is provided with two series of sockets $d, d$ arranged tangentially to a circle concentric with the axis of the wheel and each adapted to receive one end of one of the spokes $c$, the other end of each spoke being attached to a socket $e$ on the rim. The socket $e$ is arranged at such an angle to the rim that the axial line drawn through it in a longitudinal direction is substantially parallel to the axial line passing through the socket $d$ carrying the other end of the spoke. By arranging the spokes in this manner the stresses imparted to them will be in the direction of their length instead of laterally as is the case with radial spokes. The spokes themselves, except at the ends which are circular, are preferably made of a somewhat oval or elliptical section, the major diameter being in the direction of the width of the wheel, and the oval portion has on one side of it a spring fin in the form of a web $f$ as shown in Figs. 3 and 4 which affords lateral rigidity to the spoke the said spring fin being preferably broadest toward the hub and narrowing toward the rim, see Fig. 3.

Any suitable means may be provided for securing the spokes to the hub and rim respectively. As shown in Figs. 1 and 2 the spokes are secured to the hub by taper pins $g$ passed through holes which intersect the holes in the sockets $d$ and enter notches $h$ formed in the spokes as shown in Fig. 5; the fins of said spokes also enter notches $d'$ formed in the sockets. As shown in Fig. 6 the socket $d$ is represented as being made tapering and the end of the spoke is correspondingly tapered to fit the said socket, a nut $i$ being provided for drawing the spoke which is provided with a collar $i'$ tightly into a socket.

The sockets $e$ carrying the outer ends of the spokes are each formed integral with a plate $j$, which plate $j$ is provided with a stud $k$ which projects through the web $a'$ of the wheel $a$ and through a hole in the plate $j$ carrying a corresponding socket on the opposite side of the web as clearly shown in Fig. 2, so that the plate $j$ of each socket is secured by its own stud $k$ and also by the stud $k$ of the corresponding socket, whereby the sockets are mutually connected in pairs and form a composite whole. The outer ends of the spokes are preferably reduced in diameter as clearly shown at $l$ in Fig. 3, and are provided with screw threaded portions $m, n$ which carry nuts $m', n'$ respectively, the nuts $m'$ being applied before the ends of the spokes are inserted into the sockets $e$, and serve as collars, while the nuts $n'$ are subsequently applied for holding the spokes tightly in position.

As shown in Fig. 7 the plate $j$ instead of carrying a socket $e$ carries two projections $o$, $o'$ through holes in which the end of the spoke is introduced, nuts $o^2$, $o^2$ serving to retain the spoke in position.

Figure 8:
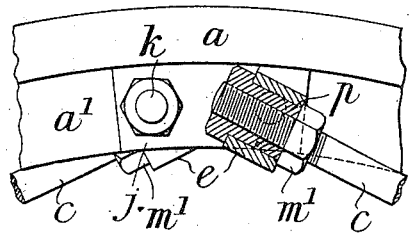

In the modification shown in Fig. 8 the socket $e$ is provided with a sleeve $p$ internally screw threaded, and which, as it is rotated in the socket serves to pull up the spoke until the nut or collar $m'$ thereon bears firmly against the said socket.

Figure 9:
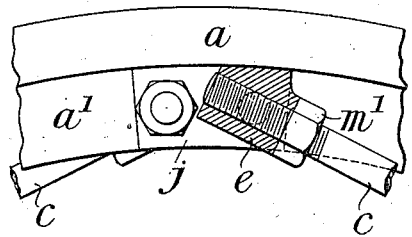

In the modification shown in Fig. 9 the end of the spoke is screw threaded and the socket $e$ is also internally screw threaded. In this modification the plate $j$ carrying the socket must not be fixed to the rim $a$ until the spoke is screwed into the socket.

Figure 10:
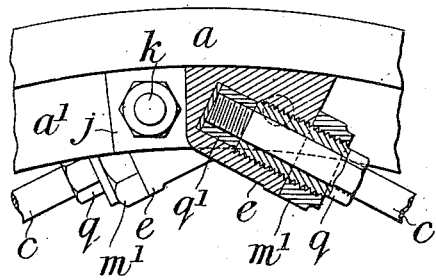

In the modification shown in Fig. 10 a sleeve $q$ which is loose upon the spoke is screwed into a screw threaded opening in the socket $e$, so that the said sleeve pushes against a collar $q^1$ screwed on to the extreme end of the spoke and gradually draws the latter down in position, the sleeve being finally locked by means of a lock nut $m'$ upon the sleeve.

Figure 11:
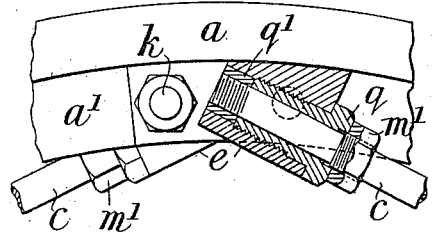

The arrangement shown in Fig. 11 is substantially the same as that shown in Fig. 10, except that the lock nut $m'$ instead of being upon the sleeve $q$, is arranged upon a screw thread upon the spoke itself.

Figure 12:
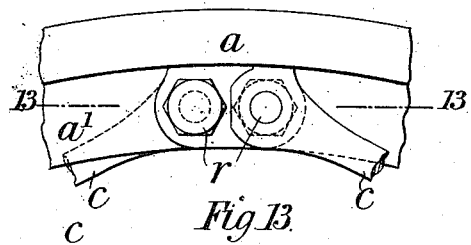
Figure 13:
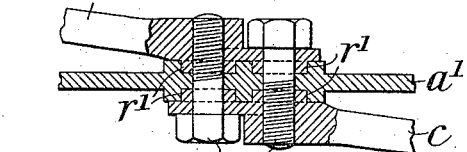

In the arrangement shown in Figs. 12 and 13 the sockets $e$ are dispensed with and the ends of the spokes are directly attached to the web $a'$ of the rim. Each spoke is secured by two bolts $r$, $r$ each bolt passing through a plain hole in one spoke, and entering a screw threaded hole in the opposite spoke, the said spokes are also provided on the inner face with lugs or protuberances $r'$, $r'$ which enter corresponding recesses formed in the web $a'$ to receive them.

Having now particularly described and ascertained the nature of my said invention and in what manner the same is to be performed, I declare that what I claim is:—

1. A spring wheel consisting of a hub and rim connected by two series of curved spring spokes, oppositely disposed, each of said spring spokes having a fin forming a flat or plate portion extending transversely of the wheel, said fin tapering from near the center of the wheel to the main body of the spoke near its outer end.

2. A spring wheel consisting of a hub and rim connected by two oppositely disposed series of curved spring spokes, oval in cross section intermediate their ends, which are circular, each of said spring spokes having a fin forming a flat or plate portion extending transversely of the wheel said fin tapering from near the center of the wheel to the main body of the spoke near its outer end.

MYLES WELLINGTON PECK.

Witnesses:
JOHN E. BOUSFIELD,
C. G. REDFERN.